United States Patent [19]

Suit

[11] 3,995,181

[45] Nov. 30, 1976

[54] MATRIX FOR ENHANCING THE FLOW OF COOLANT THROUGH AN ALTERNATOR STATOR

[75] Inventor: Louis J. Suit, Rockford, Ill.

[73] Assignee: Sundstrand Corporation, Rockford, Ill.

[22] Filed: June 13, 1975

[21] Appl. No.: 586,775

[52] U.S. Cl. .................................. 310/58; 310/53; 165/104 M
[51] Int. Cl.² ......................................... H02K 9/00
[58] Field of Search ................. 310/52, 54, 53, 57, 310/58, 59, 60, 63–65, 43, 66, 260; 165/104 M; 174/12, 18; 336/92

[56] References Cited
UNITED STATES PATENTS

| | | | |
|---|---|---|---|
| 2,036,068 | 3/1936 | Montsinger | 174/118 |
| 2,975,309 | 3/1961 | Seidner | 310/54 |
| 3,123,729 | 3/1964 | Fagel | 310/64 |
| 3,670,276 | 6/1972 | Theodore | 174/12 |
| 3,743,867 | 7/1973 | Smith | 310/52 |
| 3,781,578 | 12/1973 | Smith | 310/52 |

FOREIGN PATENTS OR APPLICATIONS 578,869   7/1946   United Kingdom................... 336/92

*Primary Examiner*—R J. Skudy
*Attorney, Agent, or Firm*—Ted E. Killingsworth; Michael B. McMurry

[57] ABSTRACT

To enhance the cooling of an alternator stator, each end of the stator including the end turns of the stator wires is enclosed in a fluid tight assembly containing a matrix of ceramic balls. Since the stator wires are contained in slots in the stator laminations, cooling of the stator wires is facilitated by the cooling fluid flowing parallel to the stator wires in the stator slots from one end assembly to the other end assembly with the ceramic balls assuring uniform coolant flow through the stator slots. An external fluid passage contains a pressure drop orifice resulting in a pressure differential between the end assemblies so that a certain proportion of the cooling fluid will flow through the stator slots.

10 Claims, 2 Drawing Figures

MATRIX FOR ENHANCING THE FLOW OF COOLANT THROUGH AN ALTERNATOR STATOR

BACKGROUND OF THE INVENTION

The invention relates to the field of generator or alternator cooling systems and more particularly to cooling systems utilizing a cooling fluid within the stator itself.

In the prior art, specifically represented by Montsinger U.S. Pat. No. 2,036,068, Theodore U.S. Pat. No. 3,670,276 and the British Patent No. 578,869, spherical insulating balls have been used in transformers and the like in order to reduce the amount of more expensive insulating fluid, usually an oil with a high dielectric coefficient, required for insulation. In addition, the prior art including Fechheimer U.S. Pat. No. 2,285,960, Cametti et al. U.S. Pat. No. 2,887,061, Seidner U.S. Pat. No. 2,975,309 and Smith U.S. Pat. No. 3,743,867, teaches the technique of circulating a cooling oil through the stator structure of a generator.

One of the major problems in designing alternators of high power output with a minimum of weight, for use in aircraft power generating systems as an example, is the provision for efficient cooling of the stator wires. To solve this problem, one approach has been to allow the coolant to flow along the stator wires in the stator slots. However, it is highly desirable to provide for even distribution of the cooling fluid over the various components of the stator since by ensuring uniform oil flow over the various components, the maximum current through the stator wires can be achieved with a minimum of structural and hence weight requirements.

SUMMARY OF THE INVENTION

It is therefore an object of the invention to provide a stator cooling system with fluid type enclosures at each end of the stator containing a plurality of ceramic balls to ensure even coolant flow in the enclosures and through the slots in the stator laminations containing the stator wires.

It is an additional object of the invention to provide the stator cooling system with fluid type enclosures containing a plurality of ceramic balls that ensure even coolant flow through slots in the stator laminations containing the stator wires along with a coolant bypass system that includes a pressure drop orifice to provide a sufficient pressure drop between enclosures ensuring adequate coolant flow through the slots.

In order to increase the cooling efficiency and hence the power output of an alternator, the stator assembly is provided with two end pieces which cover the end turns of the stator windings and which form a fluid tight seal with the ends of the stator. The cavities formed by the end pieces are completely filled with a matrix comprised of spherical ceramic balls coated with an insulating material compatible with the insulating material covering the stator wires. Cooling oil is applied to one of the end assemblies and circulates evenly through the cooling matrix and around all of the end turns. A portion of the cooling oil also flows through the stator slots serving to cool the stator wires in the stator laminations. The cooling matrix serves to ensure that there is an even distribution of the cooling oil throughout the end assemblies and a uniform flow through each of the stator slots.

In addition to the oil flowing through the stator slots, a bypass channel is provided to permit a portion of the oil contained in the inlet assembly to bypass the stator laminations and to flow directly to the outlet assembly. Included in this bypass channel is a pressure drop orifice which serves to create sufficient pressure on the inlet side to force some of the cooling oil through the stator slots. The bypass is provided in order to ensure that there is sufficient oil of a low enough temperature flowing past the end turns in the outlet side of the stator to provide adequate cooling for those turns. If all the cooling oil passed through the stator slots it would absorb enough heat from the stator wires to seriously reduce the ability of the coolant to adequately cool the end turns in the outlet side of the stator. Therefore it is desirable to have this type of bypass.

DETAILED DESCRIPTION OF THE INVENTION

Figure 1:
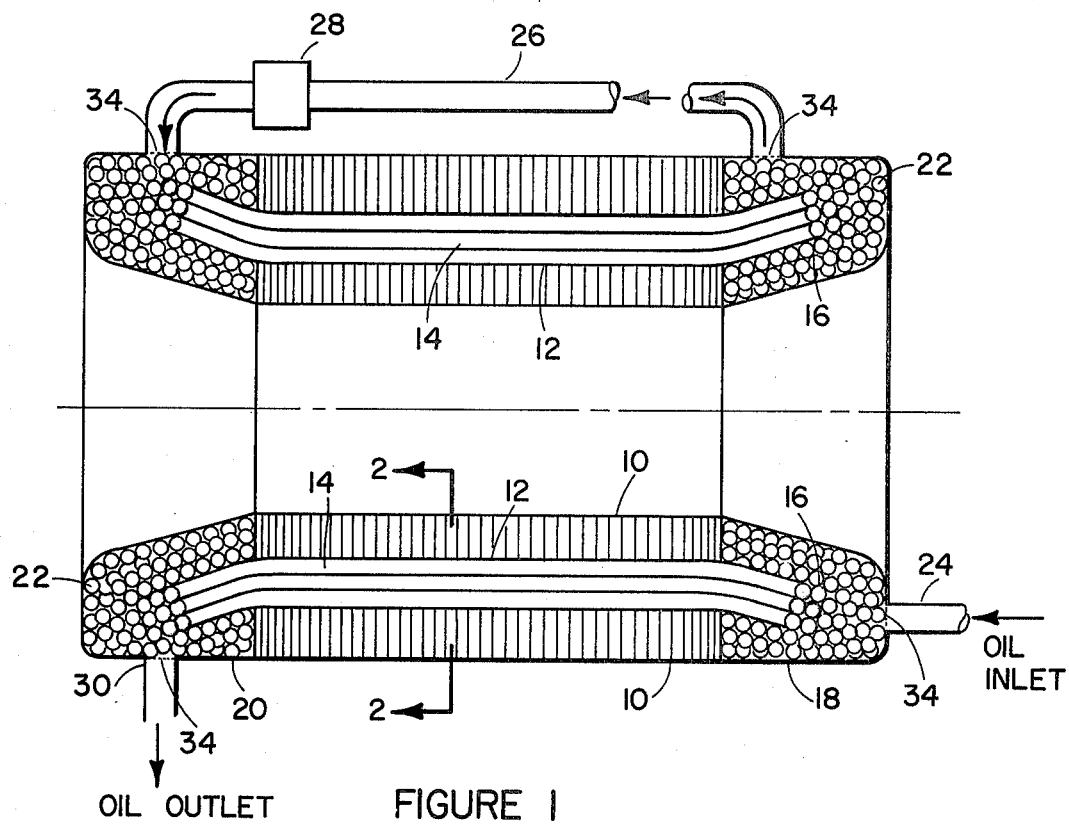
FIG. 1 is a cross-section view of a stator assembly including a cooling matrix.

The preferred embodiment of the invention is illustrated in FIG. 1 of the drawings which represents a sectional view of a motor or generator stator where the rotor is not shown. As is typical of many generators and motors, the stator is composed of a series of laminations 10 having a number of slots 12 spaced evenly about the circumference of the stator and running parallel to the axis of the stator. The stator slots 12 contain the stator wires 14 that, as they emerge from the slots 12, form a series of end turns 16. At each end of the stator is an enclosure, represented by the reference numerals 18 and 20, that serves to enclose the end turns 16 in a fluid-tight assembly.

Each of the end assemblies 18 and 20 in addition to containing the end turns 16, contains a matrix of spherical ceramic balls which completely fill the cavity formed by the end assemblies 18 and 20. Preferably, the ceramic balls 22 will be of the same diameter as the stator wires 14. The end assemblies 18 and 20 are completely and uniformly filled with the spherical ceramic balls 22 wherein the ceramic balls 22 are coated with an insulating material compatible with the insulating material used on the stator wires 14. After each end assembly has been filled with the ceramic balls 22 and attached to the stator, the entire stator assembly is heated to a temperature that is sufficient to bond the ceramic balls to one another and to the insulation of the stator wires. One of the objects of heating the stator and cooling matrix 22 in this manner is to insure that the ceramic balls remain in place.

Figure 2:
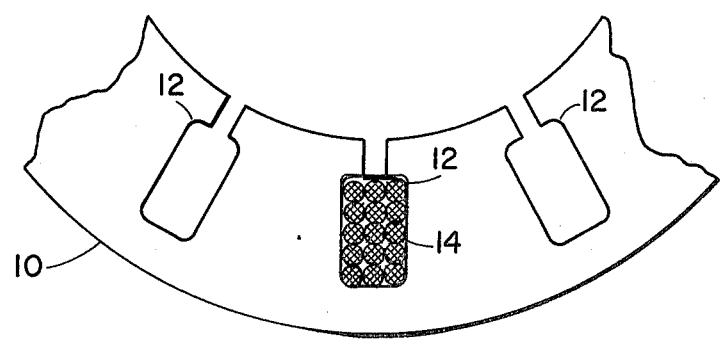
FIG. 2 is a portion of one of the stator laminations of FIG. 1 taken along lines 2—2.

The inlet end assembly 18 includes an inlet 24 for supplying a coolant such as cooling oil to the stator. Cooling oil from the oil inlet 24 flows through the cooling matrix 22 and past each of the end turns 16. A portion of the cooling oil also flows through the stator slots 12 in the open passageways between the stator wires 14 as shown in FIG. 2. FIG. 2 is a portion of one of the stator laminations 10 showing a cross-section of several of the stator slots 12 with cross-section of stator wires 14 in the center slot taken along the section line 2—2 of FIG. 1. The cooling oil flows through the stator slots 12 from the inlet assembly 18 to the outlet assembly 20 absorbing heat from the stator wires 14 as it travels through the slots 12.

In addition, a portion of the cooling oil in the inlet assembly 18 flows through a bypass channel or pipe 26 from the inlet assembly 18 to the outlet assembly 20. Since the cooling oil flowing through the stator slots 14 will absorb significant amounts of heat, it is considered desirable to have a certain portion of the oil from the inlet assembly 18 flow directly to the outlet assembly 20 through the bypass pipe 26 in order to provide for adequate cooling of the stator end turns 16 in the outlet assembly 20. Included in the bypass pipe 26 is a pressure drop orifice 28 that serves to create a pressure drop, or differential, between the inlet assembly 18 and the outlet assembly 20. The pressure differential between the inlet assembly 18 and the outlet assembly 20 is required in order to insure that the cooling oil will flow through the stator slots 12. After the cooling oil has flowed past the stator turns 16 in the outlet assembly 20, it is permitted to flow through an outlet pipe 32 to a cooling mechanism (not shown). Each of the cooling oil inlets and outlets also includes a small screen, indicated by the reference numerals 34, to prevent the ceramic balls from escaping from the assemblies 18 and 20 into other areas of the alternator.

Thus, by providing a cooling matrix 22 comprised of a plurality of spherical ceramic balls an even distribution and flow of cooling oil is provided thereby minimizing the amount of cooling oil required in the system and as a result providing for a more uniform heat transfer with a minimum of structural requirements.

I claim:

1. A cooling system for use in electrical machinery having a stator with a plurality of slots containing stator wires comprising:
   fluid tight end enclosures encompassing each end of the stator;
   a matrix comprised of a plurality of generally spherically shaped elements substantially filling each of said end enclosures;
   inlet means for admitting coolant to one of said end enclosures;
   outlet means for permitting coolant to flow from the other of said end enclosures; and
   bypass means for permitting a portion of the coolant to flow from one end enclosure to the other without passing through the stator slots.

2. The cooling system of claim 1 wherein said spherically shaped elements are formed of a ceramic material.

3. The cooling system of claim 1 wherein said bypass means includes pressure drop means for maintaining a pressure differential between said end enclosures.

4. The cooling system of claim 3 wherein said pressure drop means includes a pressure drop orifice.

5. The cooling system of claim 4 wherein said spherically shaped elements are of substantially the same diameter as the stator wires.

6. The cooling system of claim 5 wherein said spherically shaped elements are coated with an insulating material compatible with the insulating material on the stator wires.

7. The cooling system of claim 6 additionally including screens on said inlet and said outlet means to prevent said spherical elements from escaping from said end enclosures.

8. A cooling system for use with electrical machinery having a stator with a plurality of slots containing stator wires wherein coolant flows through the slots comprising:
   fluid tight end enclosures encompassing each end of the stator;
   a matrix comprised of ceramic spheres, each having a diameter substantially equivalent to the diameter of the stator wires and coated with an insulating material compatible with the insulating material of the stator wires, wherein said spheres substantially fill said end enclosures;
   inlet means for admitting coolant to one of said end enclosures;
   outlet means for permitting the coolant to flow out from the other of said end enclosures;
   means for preventing said spheres from escaping from said end enclosures; and
   a bypass channel for permitting a portion of the coolant to flow from one of said end enclosures to the other of said end enclosures without passing through the stator slots.

9. The cooling system of claim 8 wherein said bypass channel additionally includes a pressure drop orifice.

10. The cooling system of claim 9 wherein said bypass channel additionally includes means to prevent said spheres from entering said channel.

* * * * *

UNITED STATES PATENT AND TRADEMARK OFFICE
CERTIFICATE OF CORRECTION

PATENT NO. : 3,995,181
DATED : November 30, 1976
INVENTOR(S) : Louis J. Suit

It is certified that error appears in the above-identified patent and that said Letters Patent are hereby corrected as shown below:

In column 1, line 37, "fluid type" should read --fluid-tight--

In column 1, line 43, "fluid type" should read --fluid-tight--

In column 3, line 17, reference numeral 32 should read --30--

Signed and Sealed this

Thirty-first Day of May 1977

[SEAL]

Attest:

RUTH C. MASON
Attesting Officer

C. MARSHALL DANN
Commissioner of Patents and Trademarks